(12) United States Patent
McCarten et al.

US010469775B2

(10) Patent No.: US 10,469,775 B2
(45) Date of Patent: Nov. 5, 2019

(54) HIGH DYNAMIC RANGE STORAGE GATE PIXEL CIRCUITRY

(71) Applicant: SEMICONDUCTOR COMPONENTS INDUSTRIES, LLC, Phoenix, AZ (US)

(72) Inventors: John P. McCarten, Penfield, NY (US); Hung Q. Doan, Rochester, NY (US); Robert Kaser, Spencerport, NY (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/476,060

(22) Filed: Mar. 31, 2017

(65) Prior Publication Data

US 2018/0288343 A1    Oct. 4, 2018

(51) Int. Cl.
*H04N 5/355* (2011.01)
*H04N 5/359* (2011.01)
*H04N 5/353* (2011.01)
*H04N 5/3745* (2011.01)

(52) U.S. Cl.
CPC ....... *H04N 5/35581* (2013.01); *H04N 5/3532* (2013.01); *H04N 5/3592* (2013.01); *H04N 5/37452* (2013.01)

(58) Field of Classification Search
CPC ............. H04N 5/35581; H04N 5/3559; H04N 5/35563; H04N 5/35554; H04N 5/35536; H04N 5/35572; H04N 5/3532; H04N 5/235; H04N 3/1568; H04N 5/2175; H04N 5/3592; H04N 5/35527; H01L 27/14887
See application file for complete search history.

(56) References Cited

U.S. PATENT DOCUMENTS

| | | | |
|---|---|---|---|
| 7,697,051 B2* | 4/2010 | Krymski | H01L 27/14609 250/208.1 |
| 8,471,315 B1 | 6/2013 | Hynecek et al. | |
| 8,830,386 B2* | 9/2014 | Wagner | G01B 11/24 348/269 |
| 9,761,739 B2* | 9/2017 | Carey | H01L 27/14629 |
| 9,888,200 B2* | 2/2018 | Hsu | H04N 5/37452 |
| 9,893,117 B2* | 2/2018 | Meynants | H01L 27/14887 |
| 10,033,947 B2* | 7/2018 | Madurawe | H04N 5/355 |
| 2006/0071254 A1 | 4/2006 | Rhodes | |
| 2006/0146159 A1 | 7/2006 | Farrier | |
| 2006/0146161 A1* | 7/2006 | Farrier | H01L 27/14603 348/308 |
| 2007/0153109 A1 | 7/2007 | Lule | |
| 2007/0165123 A1* | 7/2007 | Panicacci | H04N 3/155 348/294 |

(Continued)

*Primary Examiner* — Chiawei Chen
(74) *Attorney, Agent, or Firm* — Treyz Law Group, P.C.; Tianyi He

(57) ABSTRACT

Image sensors may include image sensor pixels that support high dynamic range (HDR) global shutter function. An image sensor pixel may include a photodiode that is coupled to multiple storage gate nodes via respective charge transfer gates. Each of the multiple storage gate nodes may be configured to store charge corresponding to different exposure periods. The storage gate nodes may be coupled in parallel or in series with the photodiode. Charge from the different exposure times can then be merged to produce a high dynamic range image signal.

19 Claims, 14 Drawing Sheets

(56) References Cited

U.S. PATENT DOCUMENTS

| | | |
|---|---|---|
| 2008/0074523 A1* | 3/2008 | Panicacci ............. H04N 5/3535 348/308 |
| 2009/0072120 A1 | 3/2009 | McGarry et al. |
| 2010/0026838 A1 | 2/2010 | Belenky et al. |
| 2010/0231771 A1* | 9/2010 | Yaghmai ............ H04N 5/35581 348/308 |
| 2010/0309333 A1 | 12/2010 | Smith et al. |
| 2011/0242378 A1* | 10/2011 | Mabuchi ........... H01L 27/14609 348/296 |
| 2011/0309236 A1 | 12/2011 | Tian et al. |
| 2012/0002089 A1 | 1/2012 | Wang et al. |
| 2012/0194686 A1* | 8/2012 | Lin ...................... H04N 5/2355 348/208.4 |
| 2013/0021507 A1* | 1/2013 | Wang ................. H04N 5/35554 348/273 |
| 2013/0037699 A1* | 2/2013 | Ihori ........................ H04N 5/32 250/208.1 |
| 2013/0222645 A1* | 8/2013 | Bilcu ....................... G06T 9/00 348/239 |
| 2013/0271623 A1* | 10/2013 | Jo ........................ H04N 5/2357 348/226.1 |
| 2014/0027613 A1 | 1/2014 | Smith |
| 2014/0211056 A1 | 7/2014 | Fan |
| 2014/0226046 A1 | 8/2014 | Lahav et al. |
| 2014/0226047 A1 | 8/2014 | Lahav et al. |
| 2014/0240547 A1* | 8/2014 | McKay ................... G06T 5/009 348/239 |
| 2014/0252201 A1* | 9/2014 | Li ...................... H01L 27/14616 250/208.1 |
| 2015/0156387 A1* | 6/2015 | Miyakoshi ......... H04N 5/35536 348/367 |
| 2015/0349150 A1* | 12/2015 | Carey ............... H01L 27/14629 257/432 |
| 2016/0013227 A1* | 1/2016 | Kim ................. H01L 27/14612 257/229 |
| 2016/0155768 A1* | 6/2016 | Yi ..................... H01L 27/14643 250/208.1 |
| 2016/0320486 A1* | 11/2016 | Murai ................... G01S 7/4868 |
| 2016/0366350 A1* | 12/2016 | Roffet ................. H04N 5/3597 |
| 2017/0006207 A1* | 1/2017 | Shen ................... H04N 5/2353 |
| 2017/0078557 A1* | 3/2017 | Kawabata .......... H04N 5/23212 |
| 2017/0078604 A1* | 3/2017 | Kobayashi ........... H01L 27/146 |
| 2017/0094203 A1* | 3/2017 | Barna ................. H04N 5/2327 |
| 2017/0111600 A1* | 4/2017 | Wang ................ G02B 23/2415 |
| 2017/0122731 A1* | 5/2017 | You .......................... G01C 3/08 |
| 2018/0184018 A1* | 6/2018 | Itano ................... H04N 5/2352 |

\* cited by examiner (TIMING NOT TO SCALE)

HIGH DYNAMIC RANGE STORAGE GATE PIXEL CIRCUITRY

BACKGROUND

This relates generally to imaging devices, and more particularly, to imaging devices with image sensor pixels.

Image sensors are commonly used in electronic devices such as cellular telephones, cameras, and computers to capture images. In a typical arrangement, an electronic device is provided with an array of image pixels arranged in pixel rows and pixel columns.

To eliminate motion artifacts, global shutter CMOS (complementary metal-oxide semiconductor) image sensors incorporate a storage node between the photodiode and readout transistors. Unlike rolling shutter CMOS pixels, the start and end of integration in global shutter CMOS image sensors occur simultaneously for all pixels. Charge stored at the storage node are then readout using the standard rolling shutter method.

Many applications require high dynamic range (HDR) performance. One method for extending the dynamic range for rolling shutter pixels is to capture multiple images with different exposure times and then merge the images together post-capture to create an HDR image. Motion artifacts are a well-known issue with rolling shutter readout. The addition of multiple exposure times only exacerbates the motion artifacts.

It is within this context that the embodiments herein arise.

DETAILED DESCRIPTION

The present embodiments relate to ways for obtaining high dynamic range (HDR) performance in a global shutter image sensor by storing the charge from different integration times into different storage nodes.

Figure 1:
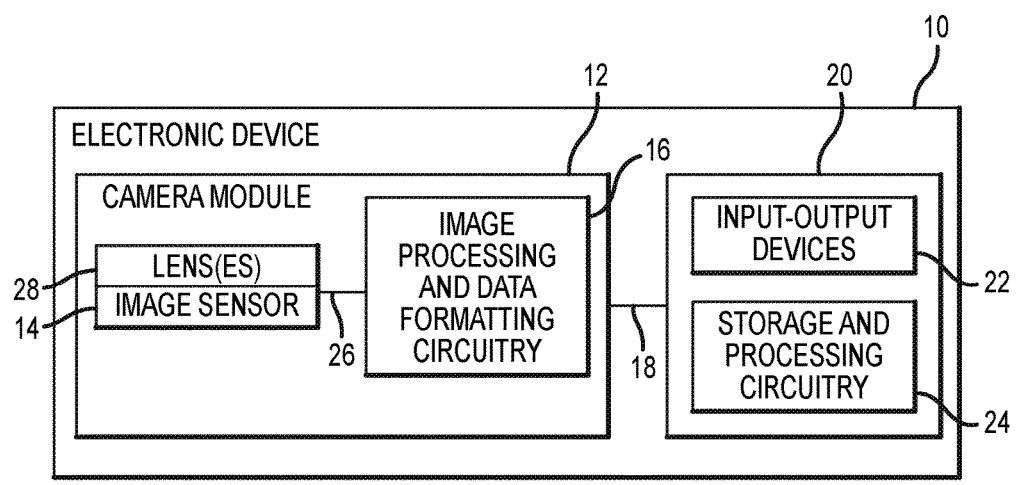
FIG. 1 is a schematic diagram of an illustrative electronic device with an image sensor having high dynamic range (HDR) storage gate pixel circuitry in accordance with an embodiment.

An electronic device with a camera module is shown in FIG. 1. Electronic device 10 (sometimes referred to as an imaging system) may be a digital camera, a computer, a cellular telephone, a medical device, or other electronic device. Camera module 12 (sometimes referred to as an imaging device) may include one or more image sensors 14 and one or more lenses 28. During operation, lenses 28 (sometimes referred to as optics 28) focus light onto image sensor 14.

Image sensor 14 may include photosensitive elements (e.g., pixels) that convert the light into digital data. Image sensors may have any number of pixels (e.g., hundreds, thousands, millions, or more of imaging pixels). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16. Image processing and data formatting circuitry 16 may be used to perform image processing functions such as automatic focusing functions, depth sensing, data formatting, adjusting white balance and exposure, implementing video image stabilization, face detection, etc. For example, during automatic focusing operations, image processing and data formatting circuitry 16 may process data gathered by three-dimensional imaging pixels in image sensor 14 to determine the magnitude and direction of lens movement (e.g., movement of lens 28) needed to bring an object of interest into focus.

Image processing and data formatting circuitry 16 may also be used to compress raw camera image files if desired (e.g., to Joint Photographic Experts Group or JPEG format). In a typical arrangement, which is sometimes referred to as a system on chip (SoC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs. This is, however, merely illustrative. If desired, camera sensor 14 and image processing and data formatting circuitry 16 may be implemented using separate integrated circuits. For example, camera sensor 14 and image processing and data formatting circuitry 16 may be formed using separate integrated circuits that have been stacked.

Camera module 12 may convey acquired image data to host subsystems 20 over path 18 (e.g., image processing and data formatting circuitry 16 may convey image data to subsystems 20). Electronic device 10 (sometimes referred to as a system or imaging system) typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Input-output devices 22 may also include light sources such as light-emitting diodes that may be used in combination with image sensor(s) 14 to obtain time-of-flight depth sensing information. Input-output devices 22 may include, for example, a light source that emits visible or infrared light.

Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2A:
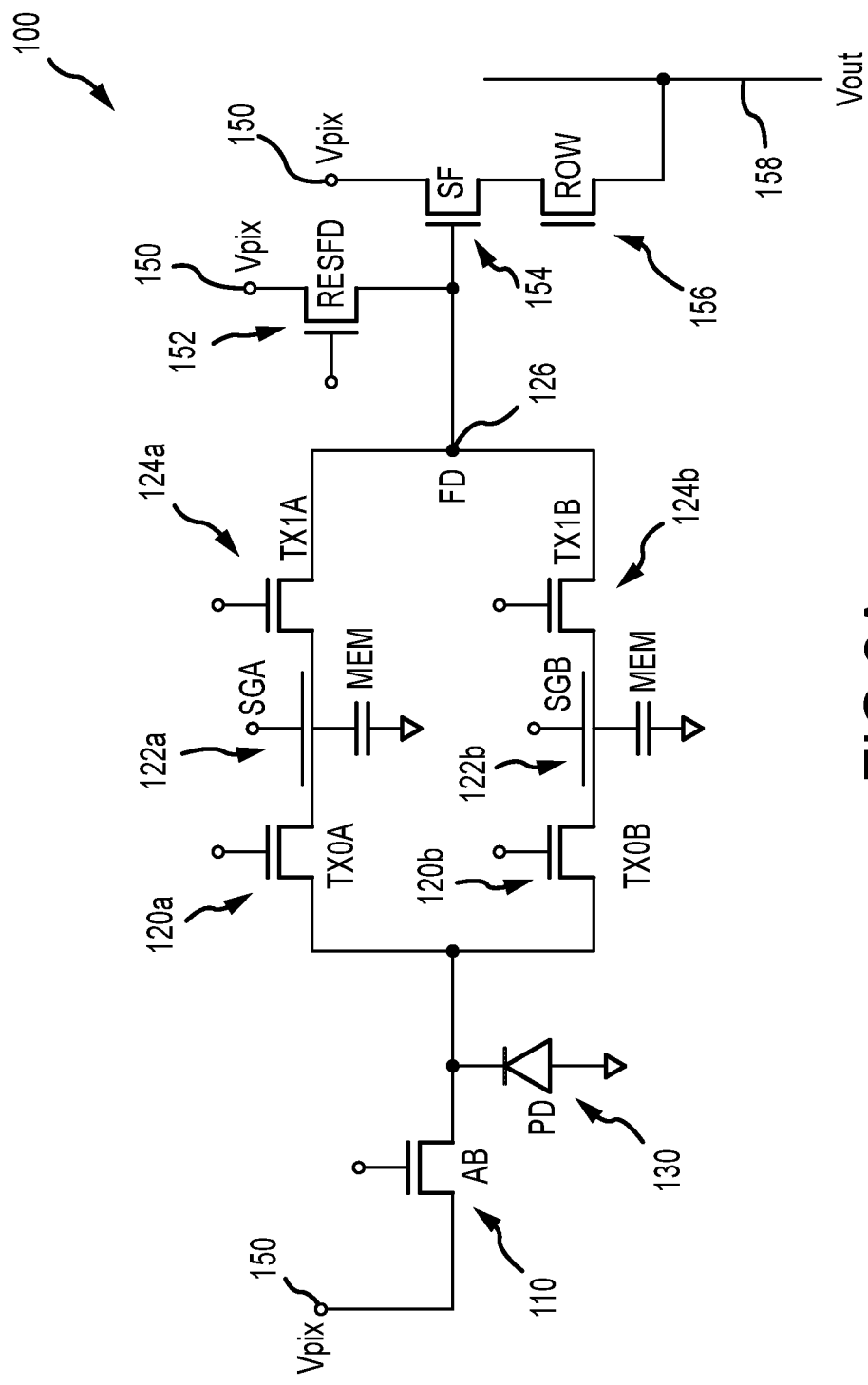
FIG. 2A is a circuit diagram of an illustrative HDR global shutter pixel in accordance with an embodiment.

FIG. 2A is a circuit diagram of an illustrative HDR global shutter pixel 100. As shown in FIG. 2A, pixel 100 may include a photodiode (PD) 130 that is coupled to supply line 150 (e.g., a line on which power supply voltage Vpix is provided) via an anti-blooming transistor 110 (controlled by signal AB). Photodiode PD may also be coupled to a shared floating diffusion node 126 via charge transfer transistor 120a (controlled by signal TX0A), storage gate 122a (controlled by signal SGA), and charge transfer transistor 124a (controlled by signal TX1A). Floating diffusion node 126 may be coupled to a corresponding column readout line 158 via additional pixel readout circuits such as reset (RESFD) transistor 152, source follower (SF) transistor 154, and row select (ROW) transistor 156.

Photodiode 130 may also be coupled to floating diffusion node 126 via charge transfer transistor 120b (controlled by signal TX0B), storage gate 122b (controlled by signal SGB), and charge transfer transistor 124b (controlled by signal TX1B).

Figure 2B:
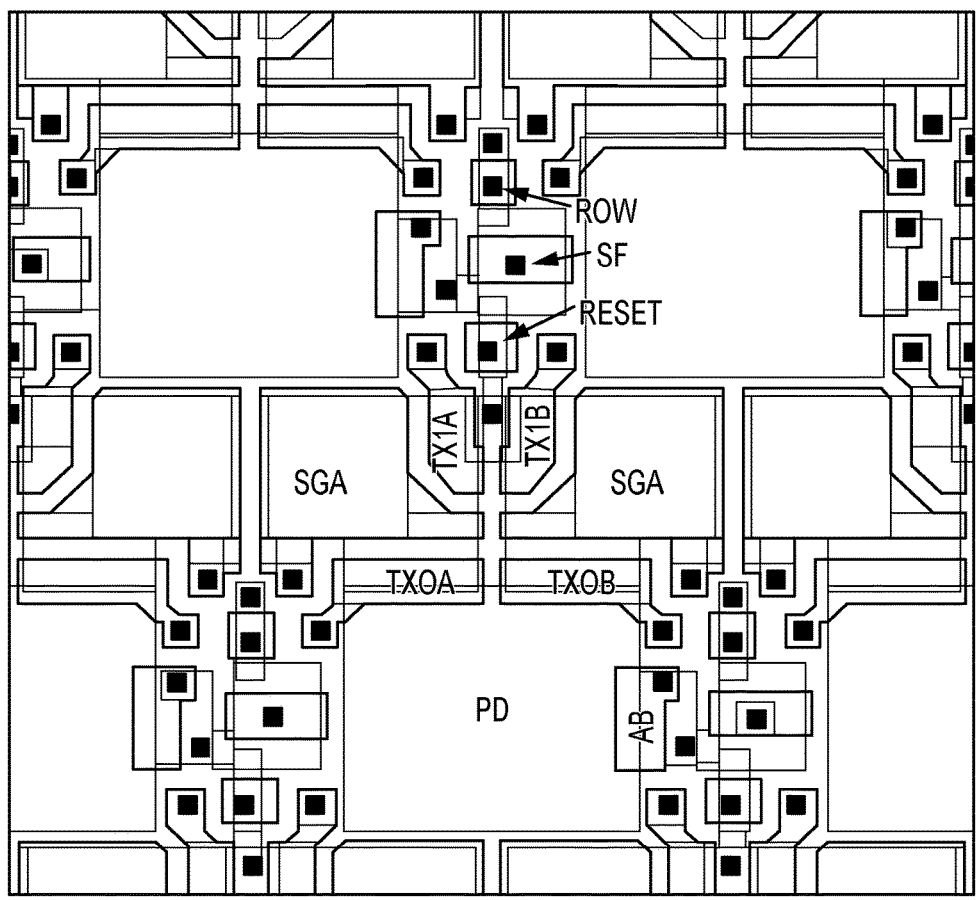
FIG. 2B is a top layout view of the pixel shown in FIG. 2A in accordance with an embodiment.

FIG. 2B is a top layout view of the pixel shown in FIG. 2A in accordance with an embodiment. As shown in FIG. 2B, the anti-blooming gate (AB) and the charge transfer gates (TX0A associated with a first exposure and TX0B associated with a second exposure) may be formed immediately adjacent to photodiode PD. Storage node SGA may be formed between gate TX0A and TX1A, whereas storage node SGB may be formed between gate TX0B and TX1B. Additional pixel transistors (e.g., reset transistors, source follower transistors, row select transistors, etc.) may be formed in the vicinity as well.

Configured in this way and referring back to FIG. 2A, photodiode 130 can be readout by two independent storage gate nodes 122a and 122b. The extended dynamic range may be obtained by merging together two images captured using a global shutter readout with two different exposure settings.

Figure 2C:
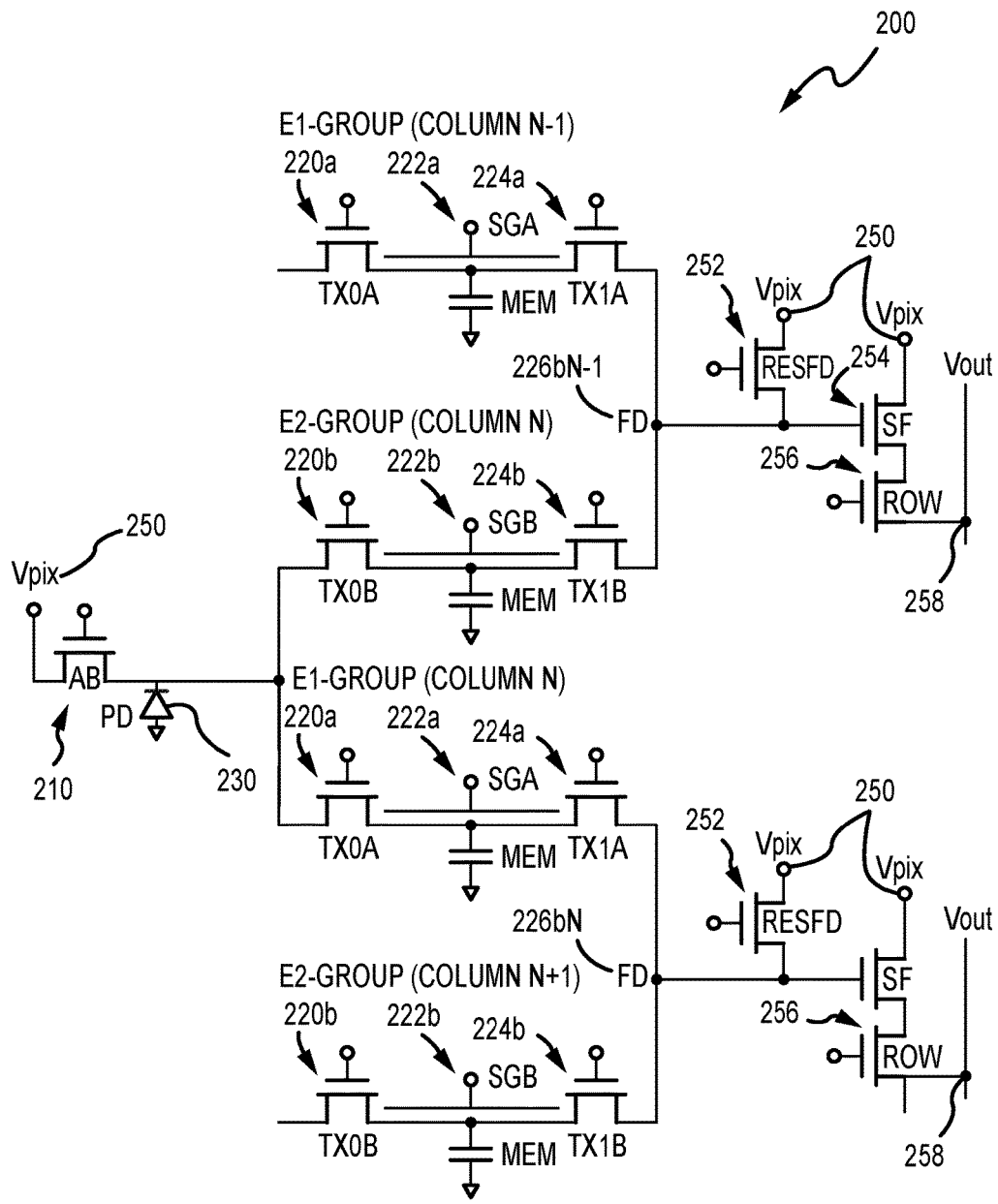
FIG. 2C is a circuit diagram of an illustrative HDR global shutter pixel that shares floating diffusion regions between adjacent columns in accordance with an embodiment.

FIG. 2C is a circuit diagram of an illustrative HDR global shutter pixel 200 that shares floating diffusion regions between adjacent columns in accordance with an embodiment. As shown in FIG. 2C, pixel 200 may include a photodiode 230 that is coupled to supply line 250 (e.g., a line on which power supply voltage Vpix is provided) via an anti-blooming transistor 210 (controlled by signal AB). Photodiode PD may also be coupled to a first floating diffusion node 226bN via charge transfer transistor 220a (controlled by signal TX0A), storage gate 222a (controlled by signal SGA), and charge transfer transistor 224a (controlled by signal TX1A). Floating diffusion node 226bN may be coupled to a corresponding column readout line 258 (in Column N) via additional pixel readout circuits such as reset transistor 252 (in Column N), source follower transistor 254 (in Column N), and row select transistor 256 (in Column N). Moreover, the first floating diffusion node 226b (in Column N) may also be coupled to charge transfer gates 220b, 222b, and 224b associated with a subsequent column (i.e., column "N+1").

Photodiode PD may further be coupled to a second floating diffusion node 226bN–1 via charge transfer transistor 220b (controlled by signal TX0B), storage gate 222b (controlled by signal SGB), and charge transfer transistor 224b (controlled by signal TX1B). The second floating diffusion node 226bN–1 may be coupled to a corresponding column readout line 258 (in Column N–1) via additional pixel readout circuits such as reset transistor 252 (in Column N–1), source follower transistor 254 (in Column N–1), and row select transistor 256 (in Column N–1). Moreover, the second floating diffusion node 226bN–1 may also be coupled to charge transfer gates 220a, 222a, and 224a associated with a preceding column.

Figure 2D:
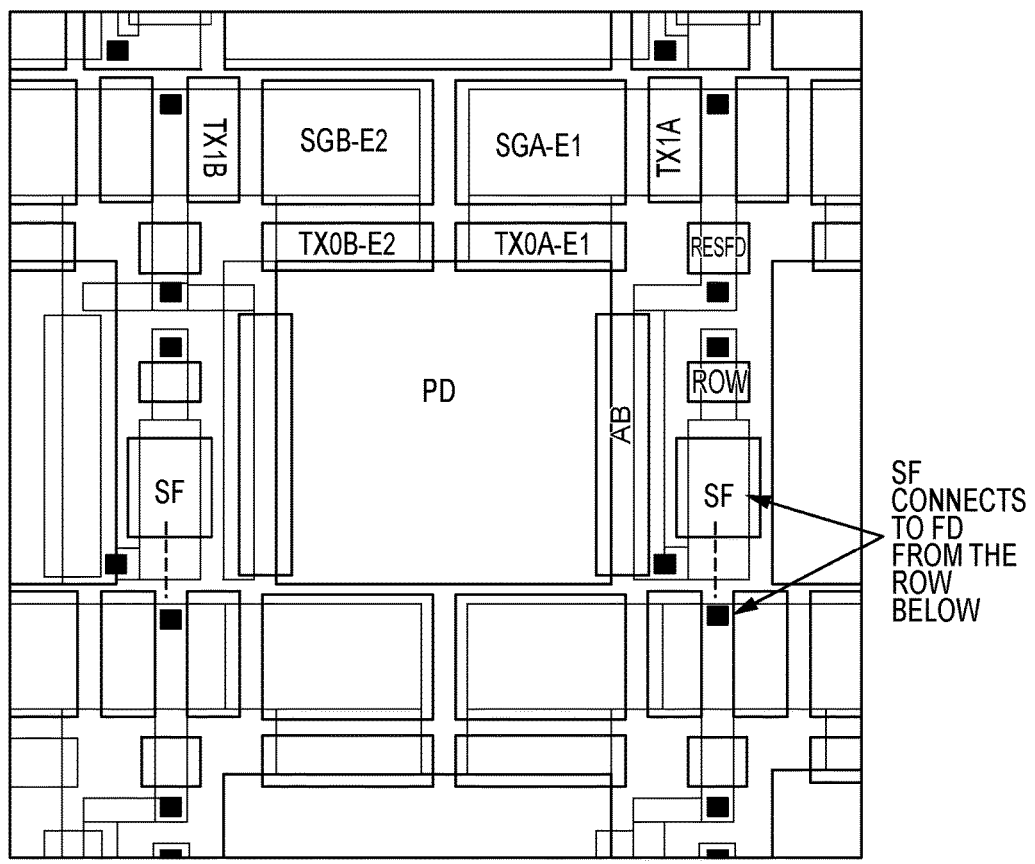
FIG. 2D is a top layout view of the pixel shown in FIG. 2C in accordance with an embodiment.

FIG. 2D is a top layout view of the pixel shown in FIG. 2C in accordance with an embodiment. As shown in FIG. 2D, the anti-blooming gate (AB) and the charge transfer gates (TX0A associated with exposure E1 and TX0B associated with exposure E2) may be formed immediately adjacent to photodiode PD. Storage node SGA may be formed between gate TX0A and TX1A, whereas storage node SGB may be formed between gate TX0B and TX1B. Additional pixel transistors (e.g., reset transistors, source follower transistors, row select transistors, etc.) may be formed in the vicinity as well. The source follower (SF) transistor may be coupled to the floating diffusion region from the row below. Each floating diffusion region may be shared between adjacent columns.

Configured in this way and referring back to FIG. 2C, photodiode 230 can be readout by two independent storage gate nodes 222a and 222b. The extended dynamic range may be obtained by merging together two images captured using a global shutter readout with two different exposure settings.

Figure 3A:
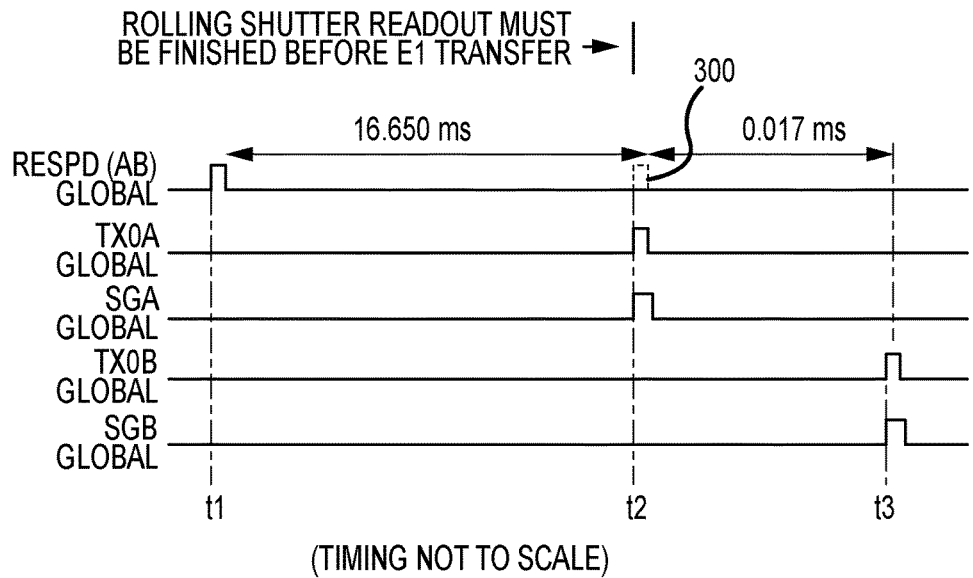
FIG. 3A is a timing diagram illustrating how two different exposure times can be captured in accordance with an embodiment.

For example, consider a scenario in which the image sensor is running at 60 fps (i.e., a 16.667 ms frame time), the read noise is 3 e-rms, and the PD/SG/FD capacity is 15 ke—for this 4.2 um pitch. The start of integration is defined by clocking AB at time t1 to empty the photodiode (see FIG. 3A). After 16.650 ms (at time t2), the first exposure (E1) photodiode charge packet is globally clocked to the SGA storage node, and after 0.017 ms (at time t3), the second exposure (E2) photodiode charge packet is globally clocked to the SGB storage node. Signal AB may optionally be clocked at time t2, as shown by pulse 300. Each storage gate node may then read out using the standard rolling shutter mode method. The rolling shutter readout can continue while the photodiode is integrating signal for the E1 exposure for the next frame.

Merging the two exposures together can help enhance the dynamic range of the final output. The images can be easily merged because since the linearity is the same for both exposures except for a multiplicative scaling factor and since there is a large overlap region for interpolation. There might be 0.017 ms of motion difference between the end of the E1 and E2 exposures, but for most application the small amount of motion difference is acceptable.

Figure 3B:
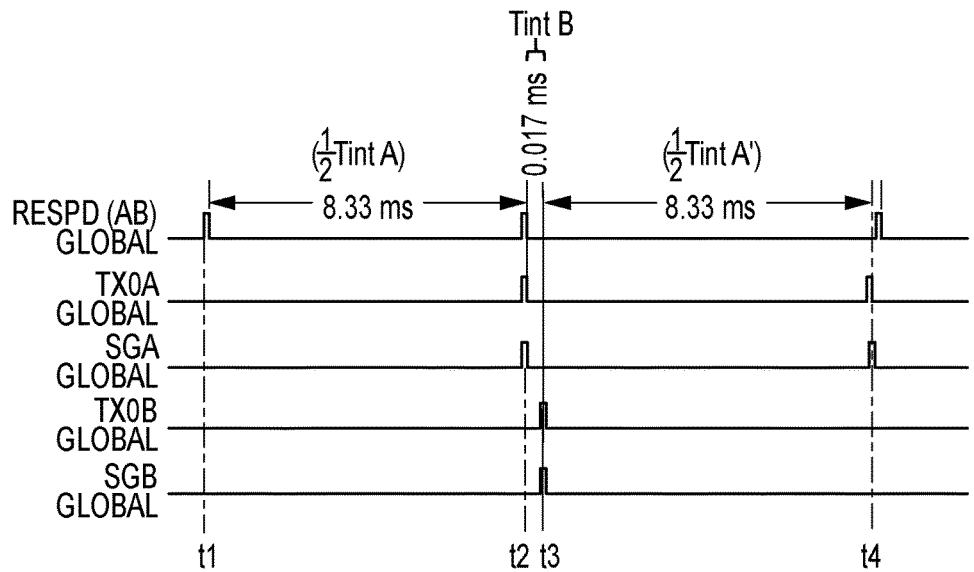
FIG. 3B is a timing diagram illustrating how an exposure time can be divided into two separate partial exposure times in accordance with an embodiment.

A timing scheme that eliminates the motion difference between the two images is illustrated in FIG. 3B. Again, pulsing AB at time t1 starts the integration. After 8.333 ms (at time t2), the first half of the E1 exposure (labeled 1/2*TintA) charge packet is transferred to the SGA node. After 0.017 ms (at time t3), the E2 exposure (labeled TintB) charge packet is transferred to the SGB node. While the photodiode is integrating the second half of the E1 exposure (labeled 1/2*TintA'), all the SGB nodes are readout using a standard rolling shutter method. Then the charge packet from the second half of the E1 exposure is transferred to the SGA node (at time t4). During the first half of the next frame, the SGA nodes are readout using a standard rolling shutter method.

Figure 3C:
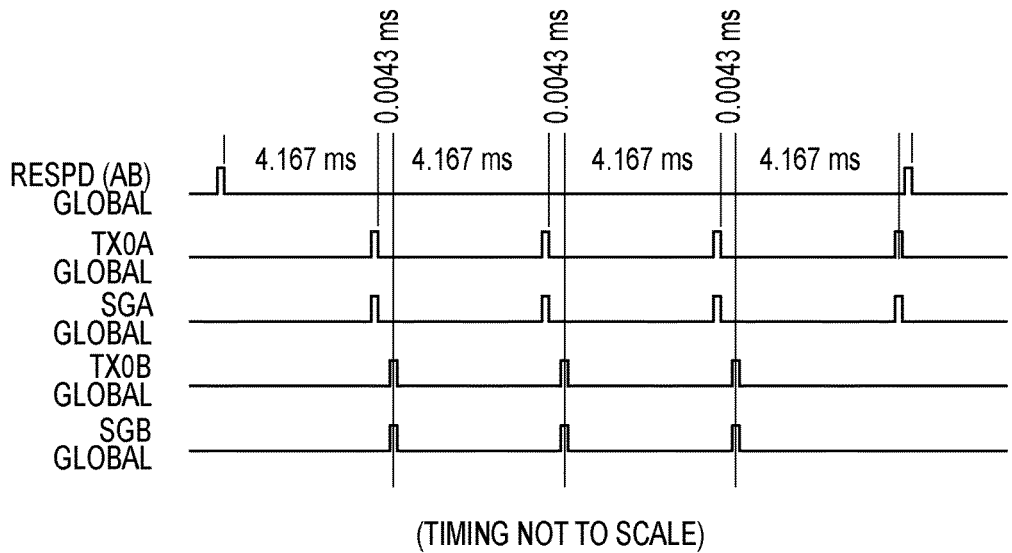
FIGS. 3C and 3D are timing diagrams illustrating how two different exposure times can each be divided into multiple partial exposure times in accordance with an embodiment.
Figure 3D:
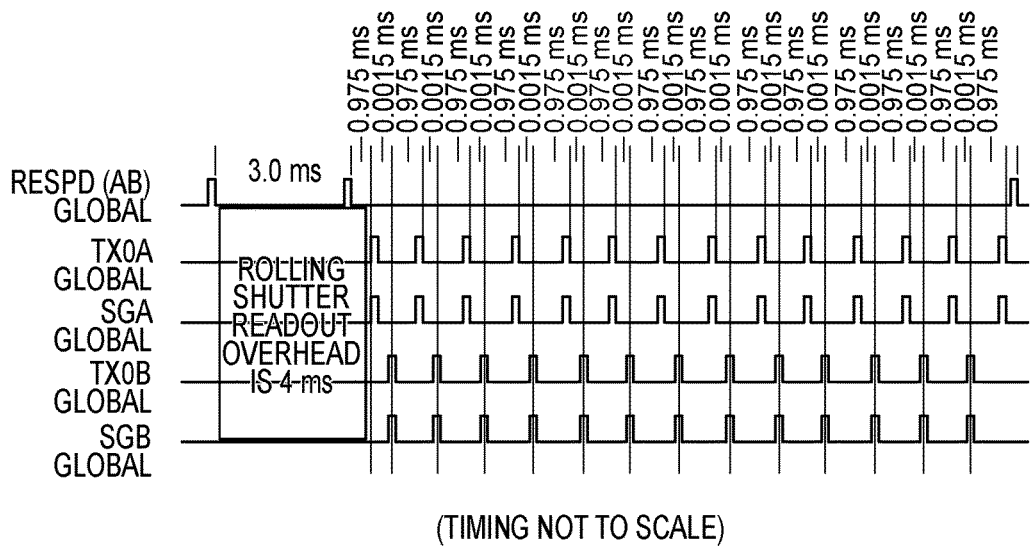

More complicated (LED Flicker Mitigation) LFM timings are possible if the SGA node can be readout faster than half the frame time. FIG. 3C shows an example where E1 is sampled four times (see, e.g., the four 4.167 ms partial exposure periods) while E2 is sampled three times (see, e.g., the three 0.043 ms partial exposure periods). More complicated LFM timings may or may not be possible depending on whether all the SGB or SGA nodes can be readout fast enough. More complicated timing schemes are still possible if part of the E1 exposure is sacrificed for the necessary rolling shutter overhead, as illustrated in FIG. 3D. FIG. 3D illustrates how E1 and/or E2 can be divided into 10 or more partial exposure periods.

Figure 4A:
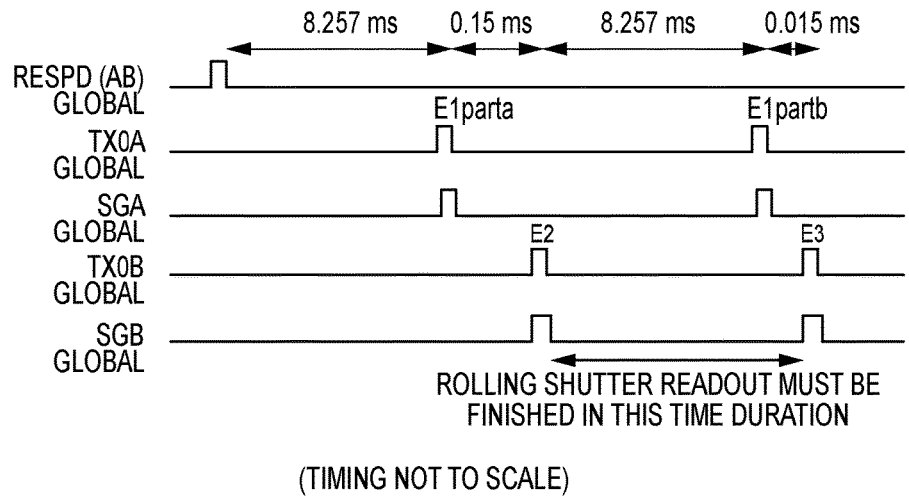
FIG. 4A is a timing diagram illustrating how three different exposure times can be captured in accordance with an embodiment.

FIG. 4A is a timing diagram illustrating how three different exposure times can be captured to further extend the dynamic range. In the example of FIG. 4A, E1 is sampled twice using SGA (see, e.g., the two 8.257 ms integration periods), E2 (e.g., the 0.15 ms integration period) is read out using SGB, and E3 (e.g., the 0.015 ms integration period) is also read out using SGB. In general, at least a 10× factor between the different exposure times may be desirable to maintain a signal-to-noise ratio (SNR) of 40. In other words, the different exposure times can be independently and separately controlled to be linearly related. Independent control of the different exposure times may obviate the need for using a dual conversion gain scheme; thus, a single gain mode might be sufficient. This is merely illustrative. In other suitable embodiments, a factor of at least 2×, 4×, 8×, 16×, 64×, or 100× may be used.

Figure 4B:
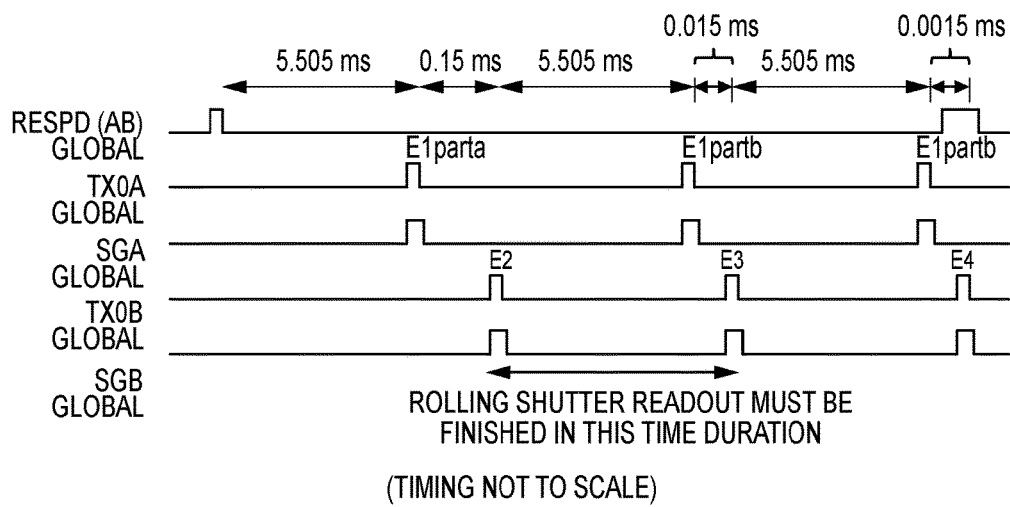
FIG. 4B is a timing diagram illustrating how four different exposure times can be captured in accordance with an embodiment.

FIG. 4B is a timing diagram illustrating how four different exposure times E1-E4 can be captured to further extend the dynamic range. In the example of FIG. 4B, E1 is sampled three times using SGA (see, e.g., the three 5.505 ms integration periods), E2 (e.g., the 0.15 ms integration period) is read out using SGB, E3 (e.g., the 0.015 ms integration period) is also read out using SGB, and E4 (e.g., the 0.0015 ms integration period) is also read out using SGB.

From a practical standpoint, it may be difficult to globally read out all the photodiodes in less than 0.0015 ms without spatial integration time shading. Thus, a simple E4 capture is impractical. One method for an E4 exposure is, with AB on, to clock TX0B/SGB to transfer charge from the PD to SGB. With AB on, only a fraction of the charge will spill into the SGB node. Operated in this way, the linearity of the E4 capture will be different than the E1, E2, and E3 captures, so merging E4 with the other captures will require a pixel by pixel lookup table and this look-up table will be lens dependent.

Another method for an E4 exposure is to read out the Global Shutter Efficiency (GSE) signal from the SGB node. The GSE signal depends only on parasitic/stray light and not on charge accumulated in the photodiode. The integration time for this node is set by clocking TX1B to clear the SGB node. Unfortunately, this node will have rolling shutter artifacts since all nodes cannot be readout at the same time. Again, the linearity for the EGSE capture will be different than the E1, E2, and E3 captures, so merging EGSE with the other captures will again require a pixel by pixel lookup table.

Another E4 capture method would be to read the GSE signal from the FD node itself.

Figure 5A:
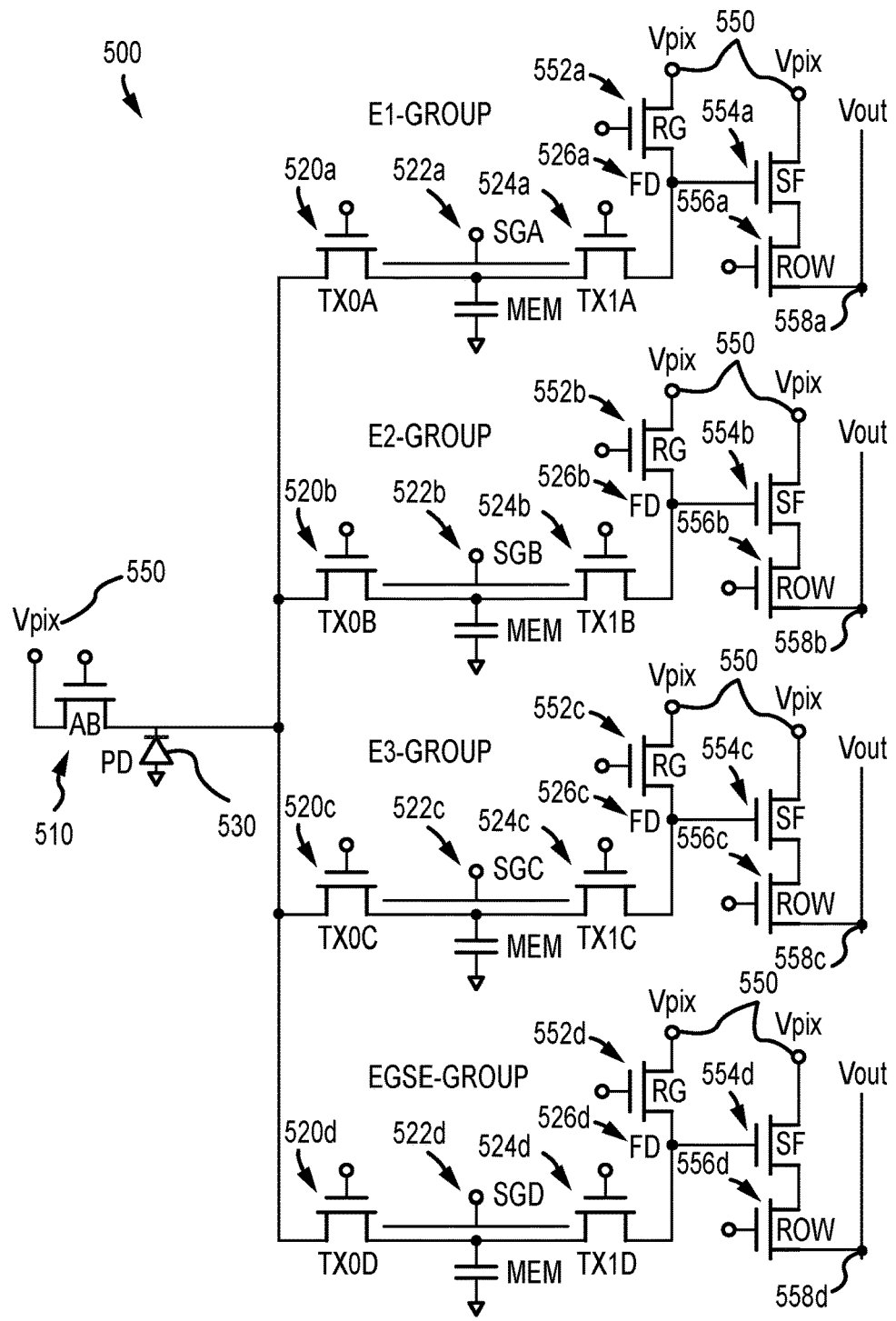
FIG. 5A is a circuit diagram of an illustrative HDR global shutter pixel that can be used to capture four different exposure times at four separate floating diffusion nodes in accordance with an embodiment.

With only two storage gate nodes SGA and SGB, it might be difficult to create LFM timings where the E2 and E3 exposures overlap in time. In another suitable arrangement, additional storage gate nodes may be included. FIGS. 5A show how photodiode 530 can be readout using four independent storage gate nodes. Arranged in this way, an extended dynamic range is obtained by merging together four images with four different exposure settings. With this configuration, the LFM timings can be implemented where all the exposure times overlap.

As shown in FIG. 5A, pixel 500 may include a photodiode 530 that is coupled to supply line 550 (e.g., a line on which power supply voltage Vpix is provided) via an anti-blooming transistor 510 (controlled by signal AB). Photodiode 530 may also be coupled to a first floating diffusion node 526a via charge transfer transistor 520a (controlled by signal TX0A), storage gate 522a (controlled by signal SGA), and charge transfer transistor 524a (controlled by signal TX1A). Floating diffusion node 526a may be coupled to a first corresponding column readout line 558a via additional pixel readout circuits such as reset transistor 552a, source follower transistor 554a, and row select transistor 556a.

Photodiode 530 may further be coupled to a second floating diffusion node 526b via charge transfer transistor 520b (controlled by signal TX0B), storage gate 522b (controlled by signal SGB), and charge transfer transistor 524b (controlled by signal TX1B). Floating diffusion node 526b may be coupled to a second corresponding column readout line 558b via additional pixel readout circuits such as reset transistor 552b, source follower transistor 554b, and row select transistor 556b.

Photodiode 530 may further be coupled to a third floating diffusion node 526c via charge transfer transistor 520c (controlled by signal TX0C), storage gate 522c (controlled by signal SGC), and charge transfer transistor 524c (controlled by signal TX1C). Floating diffusion node 526c may be coupled to a third corresponding column readout line 558c via additional pixel readout circuits such as reset transistor 552c, source follower transistor 554c, and row select transistor 556c.

Photodiode 530 may further be coupled to a fourth floating diffusion node 526d via charge transfer transistor 520d (controlled by signal TX0D), storage gate 522d (controlled by signal SGD), and charge transfer transistor 524d (controlled by signal TX1D). Floating diffusion node 526d may be coupled to a fourth corresponding column readout line 558d via additional pixel readout circuits such as reset transistor 552d, source follower transistor 554d, and row select transistor 556d.

Figure 5B:
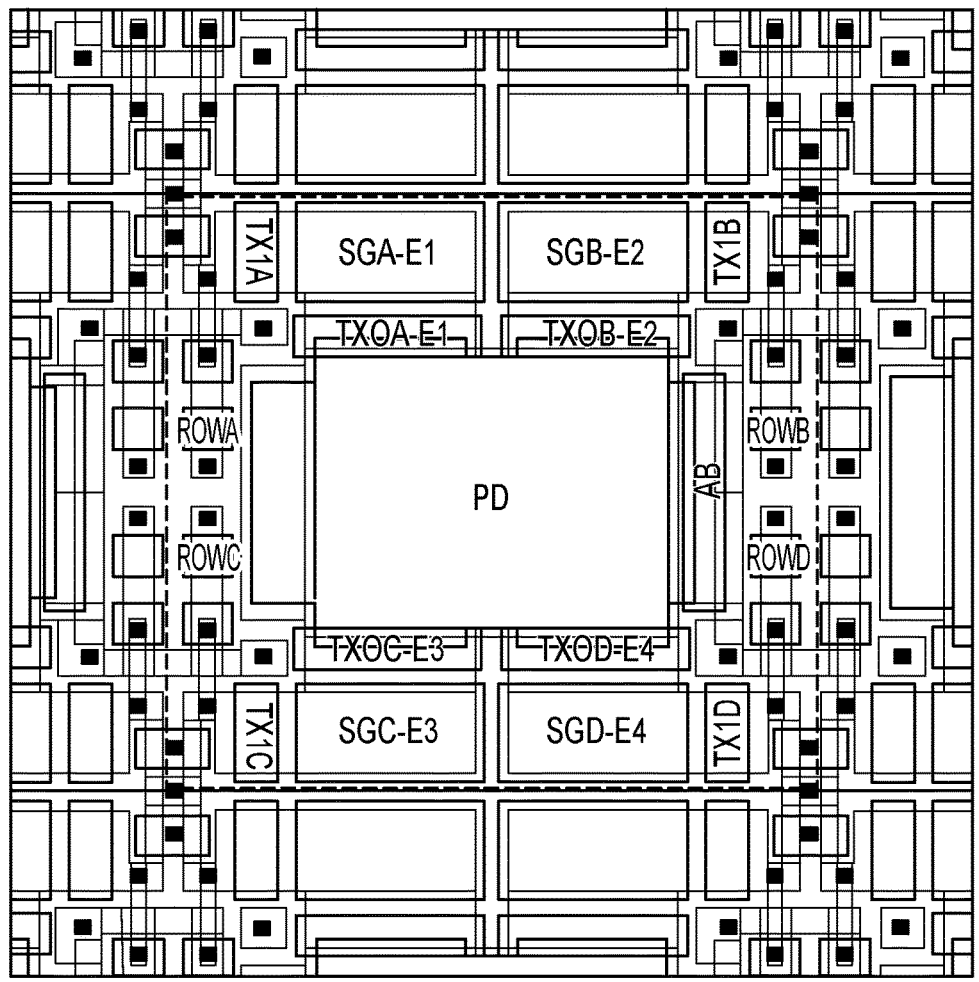
FIG. 5B is a top layout view of the pixel shown in FIG. 5A in accordance with an embodiment.

FIG. 5B is a top layout view of the pixel shown in FIG. 5A in accordance with an embodiment. As shown in FIG. 5B, the anti-blooming gate (AB) and the charge transfer gates (TX0A associated with exposure E1, TX0B associated with exposure E2, TX0C associated with exposure E3, and TX0D associated with exposure E4) may be formed immediately adjacent to photodiode PD. Storage node SGA may be formed between gate TX0A and TX1A; storage node SGB may be formed between gate TX0B and TX1B; storage node SGC may be formed between gate TX0C and TX1C; and storage node SGD may be formed between gate TX0D and TX1D. Additional pixel transistors (e.g., reset transistors, source follower transistors, row select transistors, etc.) for each of the four floating diffusion regions may be formed in the vicinity as well.

Figure 6:
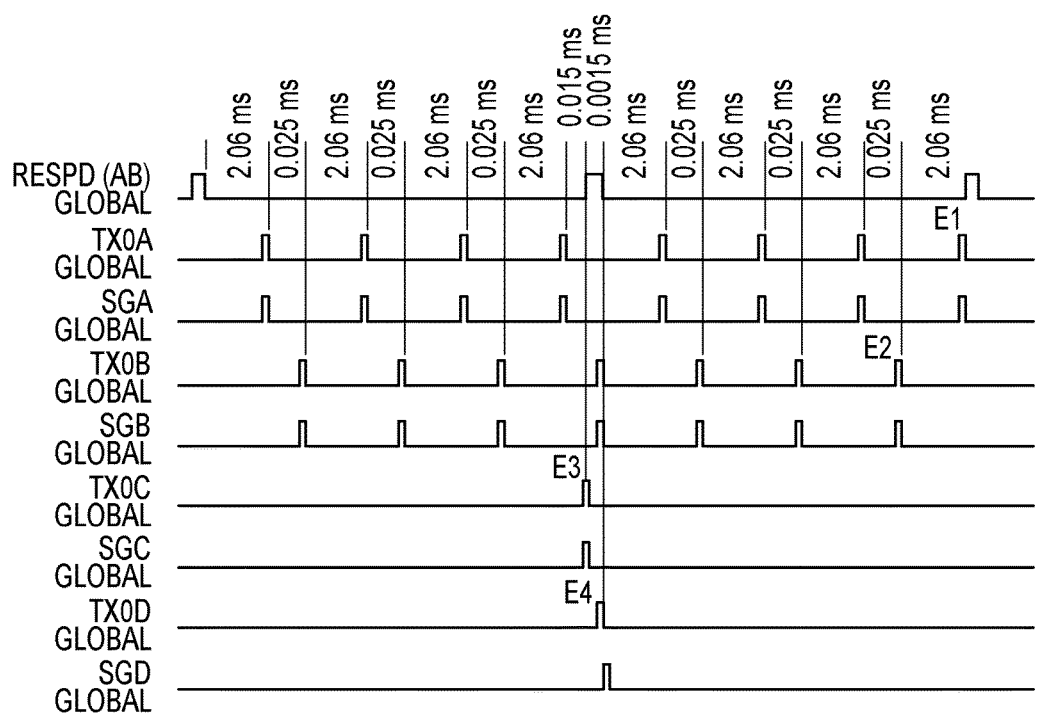
FIG. 6 is a timing diagram illustrating how the pixel of FIGS. 5A and 5B can be operating in accordance with an embodiment.

An example of an LFM timing is given in FIG. 6. FIG. 6 shows an example where E1 is sampled eight times (see, e.g., the eight 2.06 ms partial exposure periods), E2 is sampled 6 times (see, e.g., the six 0.025 ms partial exposure periods), E3 is sampled once (see, e.g., the 0.015 ms exposure period), and E4 is also sampled once (see, e.g., the 0.0015 ms exposure period). This is merely illustrative. If desired, more complicated timing schemes are still possible.

Also note that for the embodiment illustrated in FIGS. 5 and 6 that signal charge that passes through each storage gate (SGA, SGB, SGC, and SGD) is readout a separate transistor trunk (RESET, SF, and ROW). It is possible to connect the FD node associated with SGA, SGB, SGC, and SGD to a single transistor trunk. This will eliminate slight gain differences due to the separate trunks, at the expense of frame rate and charge to voltage conversion gain.

Figure 7A:
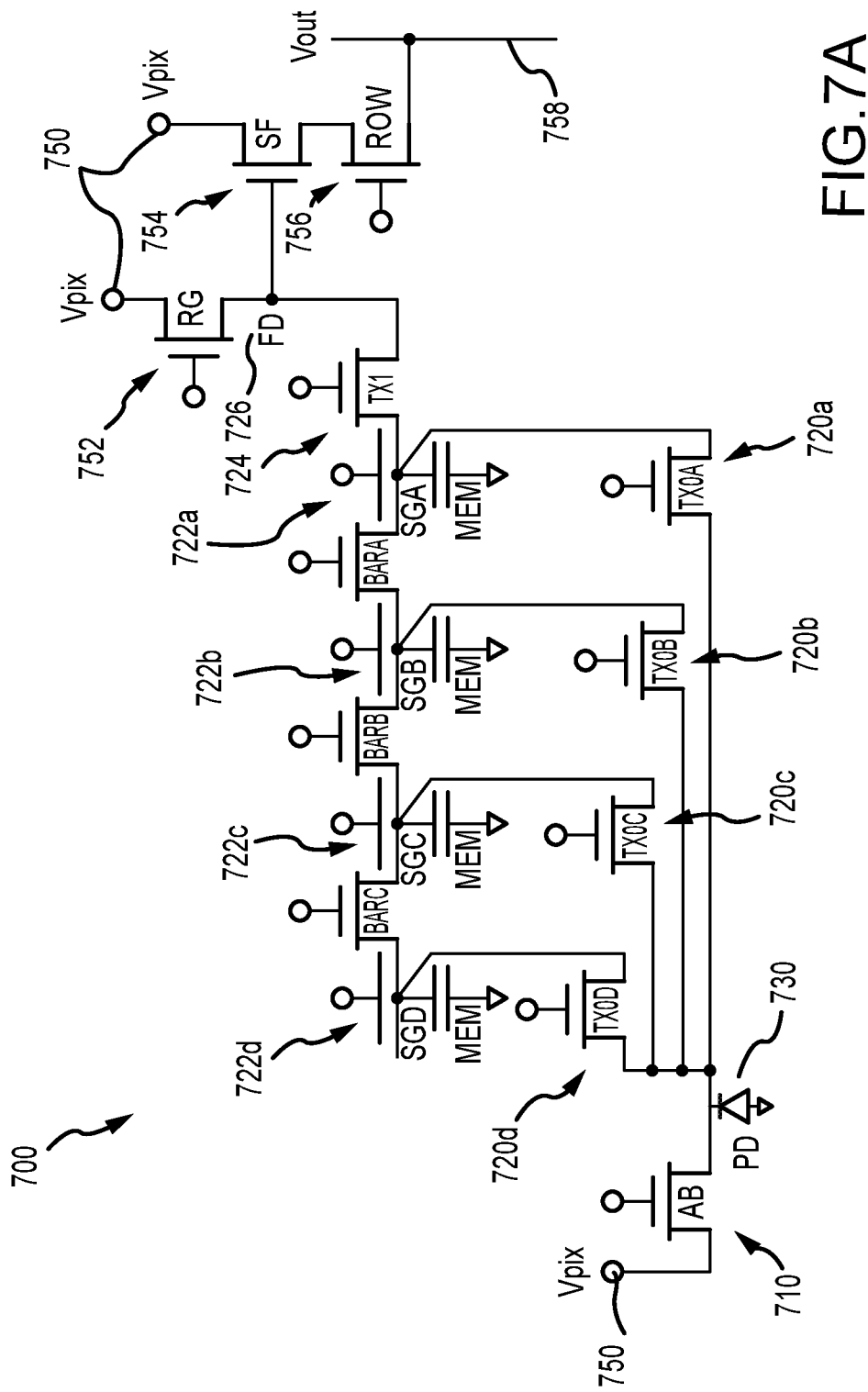
FIG. 7A is a circuit diagram of an illustrative HDR global shutter having a serial readout configuration in accordance with an embodiment.

FIG. 7A shows another suitable embodiment where pixel 700 includes four storage nodes separated by three barrier isolation implants. As shown in FIG. 7A, pixel 500 may include a photodiode 730 that is coupled to supply line 750 (e.g., a line on which power supply voltage Vpix is provided) via an anti-blooming transistor 710 (controlled by signal AB). Photodiode 730 may also be coupled to a first storage gate node 722a via charge transfer transistor 720a (controlled by signal TX0A), to a second storage gate node 722b via charge transfer transistor 720b (controlled by signal TX0B), to a third storage gate node 722c via charge transfer transistor 720c (controlled by signal TX0C), and also to a fourth storage gate node 722d via charge transfer transistor 720d (controlled by signal TX0D).

A first barrier isolation implant (controlled by signal BARA) may be formed between SGA and SGB. A second barrier isolation implant (controlled by signal BARB) may be formed between SGB and SGC. A third barrier isolation implant (controlled by signal BARC) may be formed between SGC and SGD. A charge transfer gate 724 (controlled by signal TX1) may couple storage gate node SGA to floating diffusion node 726. Floating diffusion node 726 may be coupled to a corresponding column readout line 758 via additional pixel readout circuits such as reset transistor 752, source follower transistor 754, and row select transistor 756. Reading data out from all the storage gates using one a common set of readout circuit (i.e., using at least the same source follower transistor) may be advantageous since the gain will be consistent across all the different exposure times.

Figure 7B:
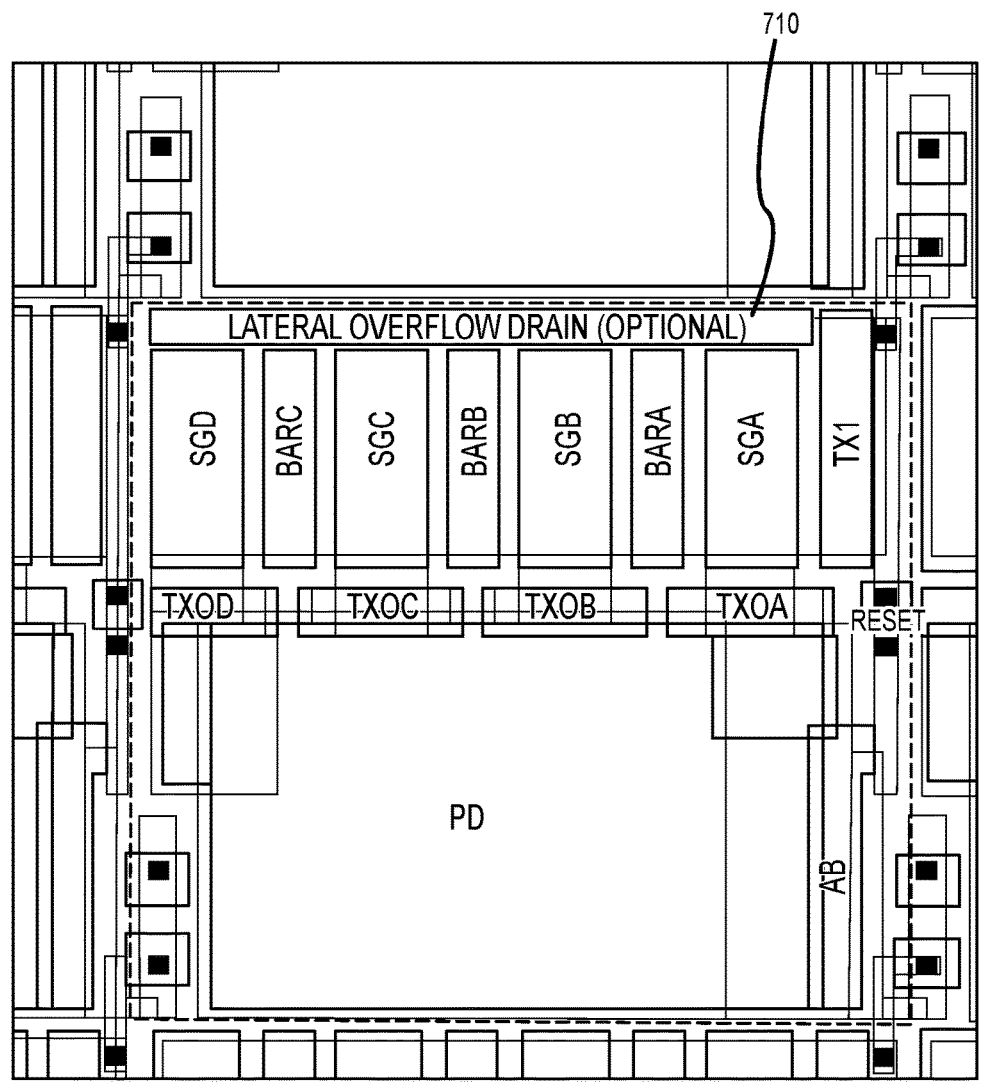
FIG. 7B is a top layout view of the pixel shown in FIG. 7A in accordance with an embodiment.

FIG. 7B is a top layout view of the pixel shown in FIG. 7A in accordance with an embodiment. As shown in FIG. 7B, the anti-blooming gate (AB) and the charge transfer gates (e.g., TX0A, TX0B, TX0C, and TX0D) may be formed immediately adjacent to photodiode PD. Storage node SGA may be formed immediately adjacent to TX0A; storage node SGB may be formed immediately adjacent to TX0B; storage node SGC may be formed immediately adjacent to TX0C; and storage node SGD may be formed immediately adjacent to TX0D. Barrier implant BARA may be physically interposed between SGA and SGB; barrier implant BARB may be physically interposed between SGB and SGC; and barrier implant BARC may be interposed between SBC and SGD. Transfer gate TX1 may be formed between SGA and the floating diffusion region, which is coupled to additional pixel transistors (e.g., reset transistors, source follower transistors, row select transistors, etc.). A lateral overflow drain such as region 710 may be required to guarantee that the E1 charge packet does not bloom into the E2 and E3 packets. Region 710 may be formed immediately adjacent to and electrically and/or physically contact the storage gate nodes and the barrier implant regions.

Moreover, if there are more than one column output line per pixel pitch then the metal wiring can be greatly simplified. This is accomplished by sharing reset, row select, and TX1 metal lines. The purpose of this disclosure is not optimization of the metal wiring, so all the different configurations if the FD node is 2-shared or 4-shared can be employed. Generalization to those cases are well known to those skilled in the art.

During operation, the PD can be readout globally to any of the SGA, SGB, SGC, or SGD storage nodes. Readout in the SGA node occurs by holding TX0A and SGA high; readout in the SGB node occurs by holding TX0B and SGB high; etc. Each of the four SG nodes are readout in a rolling shutter fashion at floating diffusion node 726, and each node is transfer forward using a CCD (Charge-Coupled Device) bucket brigade technique.

As an example, if the E1 exposure using an LFM timing contains 4 partial captures, the first partial E1 capture would occur by transferring the PD electron packet into SGD. If the SG nodes advance 1 phase, then after the second E1 partial capture, the next PD electron packet is transferred into SGC. If the SG nodes advance 1 more phase, then after the third partial E1 capture, the next PD electron packet is transferred into SGB. Finally, if the SG nodes advance 1 more phase, then after the fourth and final partial E1 capture, the last PD electron packet is transferred into SGA. Thereafter, the total E1 charge packet is readout in a rolling shutter manner.

Figure 8:
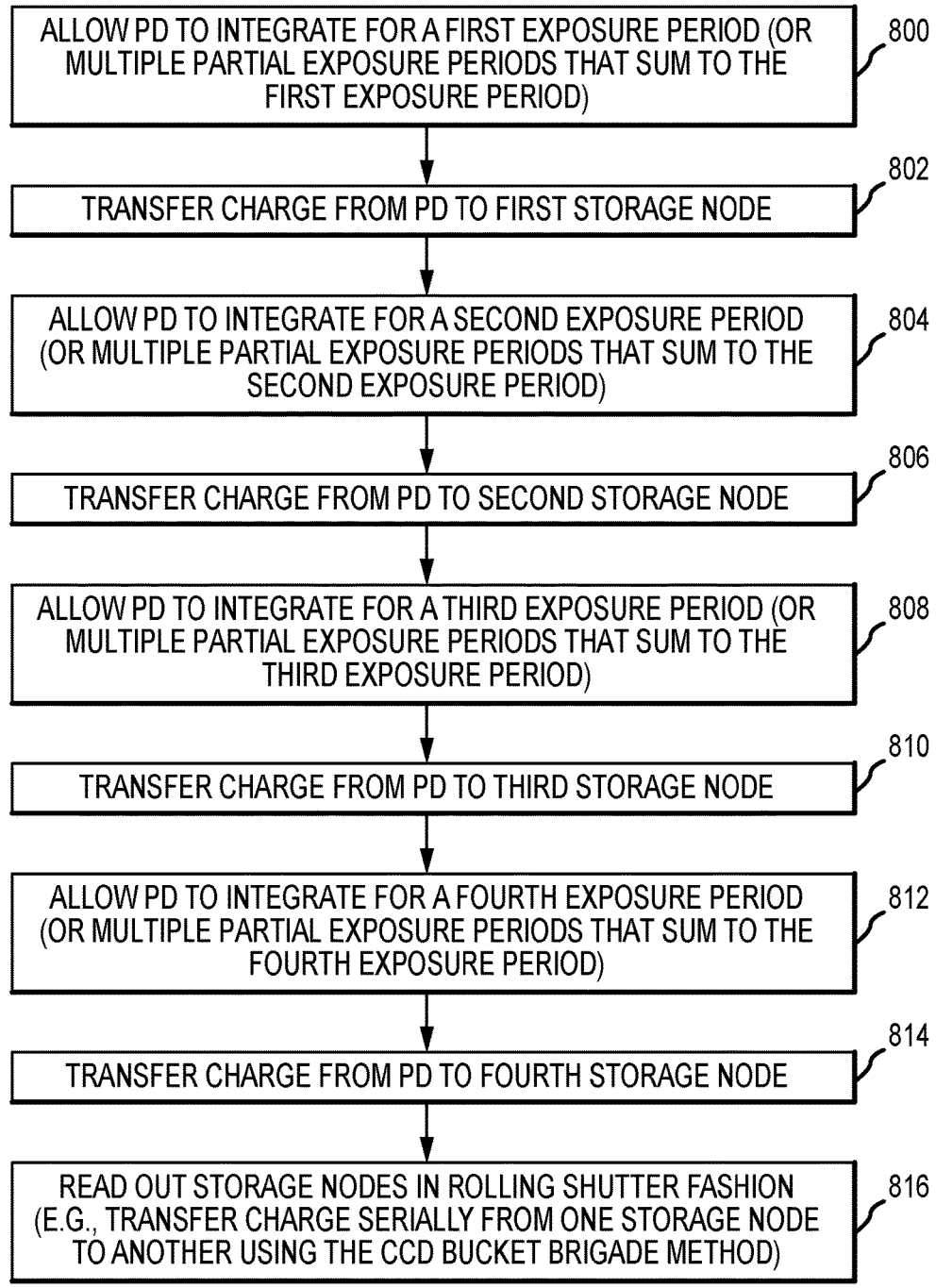
FIG. 8 is a flow chart of illustrative steps for operating the pixel of FIGS. 7A and 7B in accordance with an embodiment.

FIG. 8 is a flow chart of illustrative steps for operating pixel 700 of the type shown in FIGS. 7A and 7B. At step 800, the photodiode may be allowed to integrate for a first exposure period E1 (or for multiple partial exposure durations that sum to E1). At step 802, the accumulated charge may be transferred from the PD to the first storage node SGA (e.g., charge could be directly transferred from the PD to SGA or through at least some of SGB-SGD).

At step 804, the photodiode may be allowed to integrate for a second exposure period E2 that is different than E1 (or for multiple partial exposure periods that sum to period E2). At step 806, the accumulated charge may be transferred from the PD to the second storage node SGB (e.g., charge could be directly transferred from the PD to SGB or through at least some of SGC-SGD).

At step 808, the photodiode may be allowed to integrated for a third exposure period E3 that is different than E1 and E2 (or for multiple partial exposure periods that sum to E3). At step 810, the accumulated charge may be transferred from the PD to the third storage node SGC (e.g., charge could be directly transferred from the PD to SGC or also though SGD).

At step 812, the photodiode may be allowed to integrated for a fourth exposure period E4 that is different than E1-E3 (or for multiple partial exposure periods that sum to E4). At step 814, the accumulated charge may be transferred from the PD to the fourth storage node SGD.

At step 816, charge may be read out from the different storage nodes in a rolling shutter fashion (e.g., the charge may be transferred serially from one storage node to another using the CCD bucket brigade method).

These steps are merely illustrative and are not intended to limit the present embodiments. The existing steps may be modified or omitted; some of the steps may be performed in parallel; additional steps may be added; and the order of certain steps may be reversed or altered.

The foregoing embodiments are merely illustrative of the principles of this invention and various modifications can be made by those skilled in the art. The foregoing embodiments may be implemented individually or in any combination.

What is claimed is:

1. An image sensor comprising:
   an image sensor pixel that comprises: a photodiode;
   a first storage gate node that stores charge integrated at the photodiode for a first exposure period;
   a second storage gate node that stores charge integrated at the photodiode for a second exposure period that is different than the first exposure period, wherein the photodiode is electrically connected to the first and second storage gate nodes via respective first and second parallel paths;
   a first floating diffusion region interposed between the first storage gate node and a first column line; and
   a second floating diffusion region interposed between the second storage gate node and a second column line; and
   an additional image sensor pixel that comprises:
   an additional photodiode; and
   a third storage gate node coupled to the additional photodiode, wherein the first floating diffusion region is interposed between the third storage gate node and the first column line.

2. The image sensor of claim 1, wherein the charge collected during the first exposure period and the charge collected during the second exposure period are linearly related.

3. The image sensor of claim 2, wherein the first exposure period is at least two times longer than the second exposure period.

4. The image sensor of claim 2, wherein the first exposure period is at least four times longer than the second exposure period.

5. The image sensor of claim 2, wherein the first exposure period is at least ten times longer than the second exposure period.

6. The image sensor of claim 1, the image sensor pixel further comprising:
   a first transfer gate coupled between the photodiode and the first storage gate node; and
   a second transfer gate coupled between the photodiode and the second storage gate node.

7. The image sensor of claim 1, wherein the charge stored in the first and second storage nodes is read out in a rolling shutter fashion.

8. The image sensor of claim 1, further comprising:
   control circuitry configured to control the image sensor pixel:
     to integrate the charge for the first exposure time by accumulating the charge during a plurality of partial exposure times summing up to the first exposure time; and
     to integrate the charge for the second exposure time, wherein at least part of the second exposure time occurs between first and second given partial exposure times in the plurality of partial exposure times.

9. The image sensor of claim 1, wherein the first floating diffusion region is coupled to a first source follower transistor and the second floating diffusion region is coupled to a second source follower transistor.

10. A method for operating an image sensor, the method comprising:
    receiving light at a photodiode;
    with the photodiode, accumulating charge for a first exposure time by accumulating the charge during a plurality of partial exposure times summing up to the first exposure time;
    transferring the charge accumulated for the first exposure time to a first storage gate node;
    with the photodiode, accumulating charge for a second exposure time, wherein at least part of the second exposure time occurs between first and second given partial exposure times in the plurality of partial exposure times; and
    transferring the charge accumulated for the second exposure time to a second storage gate node that is different than the first storage gate node.

11. The method of claim 10, wherein the first exposure time is at least ten times longer than the second exposure time.

12. The method of claim 10, further comprising:
    with the photodiode, accumulating charge for a third exposure time, wherein the first, second, and third exposure times are independently controlled and are different in duration; and
    transferring the charge accumulated for the third exposure time to a third storage gate node that is different than the first and second storage gate nodes.

13. The method of claim 10, further comprising:
    transferring charge between the first and second storage gate nodes.

14. The method of claim 10, wherein the first and second exposure times are independently controlled.

15. The method of claim 10, further comprising:
    generating an image based on the charge accumulated for the first exposure time and the charge accumulated for the second exposure time.

16. An electronic device comprising:
    a camera module having an image sensor, the image sensor comprising an image sensor pixel, and the image sensor pixel comprising:
    a photodiode;
    a first storage gate region that is coupled to the photodiode and that stores charge for a first exposure time;
    a second storage gate region that is coupled to the photodiode and that stores charge for a second exposure time;
    a floating diffusion region, wherein the first storage gate region is interposed between the second storage gate region and the floating diffusion region;
    a first charge transfer transistor that directly connects the photodiode to the first storage gate region; and
    a second charge transfer transistor that directly connects the photodiode to the second storage gate region.

17. The electronic device of claim 16, the image sensor pixel further comprising:
    a barrier implant region interposed between the first and second storage gate regions, wherein the barrier implant region has a terminal that receives a control signal.

18. The electronic device of claim 17, the image sensor pixel further comprising:
    a lateral overflow drain region that physically contacts the barrier implant region, the first storage gate region, and second storage gate region.

19. The electronic device of claim 16, wherein the first and second storage gate regions are coupled in series to the floating diffusion region, the first storage gate region is connected to the photodiode via a first path, and the second storage gate region is connected to the photodiode via a second path that is separate from the first path.

* * * * *